US009105164B2

(12) United States Patent
Clymer et al.

(10) Patent No.: US 9,105,164 B2
(45) Date of Patent: Aug. 11, 2015

(54) REMOTE CONTROL HAVING INDICIA AND A LOCATOR BUMP

(71) Applicant: Lutron Electronics Co., Inc., Coopersburg, PA (US)

(72) Inventors: Erica L. Clymer, Nazareth, PA (US); William Taylor Shivell, Breinigsville, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 107 days.

(21) Appl. No.: 13/785,732

(22) Filed: Mar. 5, 2013

(65) Prior Publication Data

US 2013/0229269 A1 Sep. 5, 2013

Related U.S. Application Data

(60) Provisional application No. 61/606,717, filed on Mar. 5, 2012.

(51) Int. Cl.

*H04L 17/02* (2006.01)
*G08B 6/00* (2006.01)
*G08C 17/02* (2006.01)

(52) U.S. Cl.

CPC *G08B 6/00* (2013.01); *G08C 17/02* (2013.01); *G08C 2201/30* (2013.01)

(58) Field of Classification Search

None

See application file for complete search history.

(56) References Cited

U.S. PATENT DOCUMENTS

| | | | | |
|---|---|---|---|---|
| 6,992,612 | B2 | 1/2006 | Pessina et al. | |
| 7,142,932 | B2 | 11/2006 | Spria et al. | |
| 7,930,212 | B2 * | 4/2011 | Perry et al. | 705/15 |
| D658,594 | S * | 5/2012 | Felegy et al. | D13/168 |
| D694,196 | S * | 11/2013 | Felegy et al. | D13/162 |
| D714,232 | S * | 9/2014 | Chambers et al. | D13/174 |
| 2008/0303796 | A1 * | 12/2008 | Fyke | 345/173 |
| 2010/0127912 | A1 * | 5/2010 | Rye et al. | 341/176 |
| 2011/0266122 | A1 * | 11/2011 | Zaharchuk et al. | 200/308 |
| 2012/0286940 | A1 * | 11/2012 | Carmen et al. | 340/12.5 |

* cited by examiner

*Primary Examiner* — Travis Hunnings

(74) *Attorney, Agent, or Firm* — Ostrolenk Faber LLP

(57) ABSTRACT

A remote control includes a plurality of actuators and plurality of similarly-shaped icons for indicating the function of actuators. At least one of the actuators includes a locator bump that is positioned inside the icon on the actuator and extends above the surface of the actuator to provide tactile feedback to assist a user's finger in locating the actuator (for example, to turn on a lighting load when the control device is being operated in the dark space). The icon that has the locator bump inside of it is bigger than the second icon, such that the icons appear to be the same size to the human eye. In addition, the line weight of the first icon may be smaller than the line weight of the second icon, and there may be a gap between the first icon and the locator bump. For example, the first and second icons may be triangularly shaped or circularly shaped.

29 Claims, 7 Drawing Sheets

REMOTE CONTROL HAVING INDICIA AND A LOCATOR BUMP

CROSS REFERENCES TO RELATED APPLICATIONS

This application is a non-provisional application of commonly-assigned U.S. Provisional Patent Application No. 61/606,717, filed Mar. 5, 2012, entitled REMOTE CONTROL HAVING INDICIA AND A LOCATOR BUMP, the entire disclosure of which is hereby incorporated by reference.

BACKGROUND OF THE INVENTION

1. Field of the Invention

The present invention relates to a control device, such as a remote control, for a load control system for controlling the amount of power delivered from a source of alternating-current (AC) power to an electrical load, and more particularly, to a battery-powered remote control having indicia and a locator bump to enhance usability of the control in dark environments.

2. Description of the Related Art

Hand-held remote control devices and wall mounted control devices are well known for the control of electrical loads such as lamps which are to be controllably dimmed and motors which drive drapes or shades towards open and closed positions. Such control devices usually have pairs of operating buttons with indicators of oppositely directed functions, such as the dimming direction of a lamp load or the drive direction of a motor or the on or off of an electrical load. An example of a remote control having such indicia is described in greater detail in commonly-assigned U.S. Patent Publication No. 2011/0266122, published Nov. 3, 2011, entitled OPERATING BUTTONS WITH DISAPPEARING TRIANGULAR INDICIA, the entire disclosure of which is hereby incorporated by reference.

Such control devices should have an aesthetically pleasing and uncluttered surface appearance while making the function of the control button obvious to the user, particularly in a darkened room or environment.

SUMMARY OF THE INVENTION

The present invention provides a remote control having a plurality of actuators or at least one pair of actuators and indicia for indicating the function of actuators. In addition, at least one of the actuators (for example, an actuator that may cause a lighting load to be illuminated or its dim-setting increased upon actuation) includes a locator bump (e.g., a protuberance) that extends from a front surface of the actuator to provide tactile feedback to assist a user's finger in locating the actuator that causes the lighting load to be turned on, or to be more strongly illuminated (e.g., when the control device is being operated in the dark space). For example, the locator bump may be located inside of the indicia on the actuator. A complementary indicator may be located on the other actuator (for example, an actuator that may cause the lighting load to turn off or dim) and is planar with its actuator surface (i.e., not providing tactile feedback).

According to an embodiment of the present invention, a remote control comprises a first planar actuator having a first planar icon and a locator bump located within a periphery of the icon, and a second planar actuator having a second planar icon that is similarly shaped to the first icon, wherein the first icon is about 5% bigger than the second icon, such that the icons appear to be the same size to the human eye.

In addition, the line weight or width of the lines forming the first icon may be smaller than the line weight of the second icon. There may be a gap between the first icon inner boundary and its locator bump. For example, the first and second complementary icons of the pair may be triangularly shaped or circularly shaped.

According to a further embodiment, the invention comprises an electrical control comprising:

a pair of first and second spaced complementary actuator buttons having coplanar surfaces; each of said pair of actuator buttons having similarly shaped planar respective first and second icons;

said first icon containing a locating bump located within the periphery of said first icon and extending above the surface of said first actuator button whereby said first actuator button with the locating bump can be tactilely distinguished from said second actuator button which is free of such a locating bump.

Other features and advantages of the present invention will become apparent from the following description of the invention that refers to the accompanying drawings.

DETAILED DESCRIPTION OF THE INVENTION

Figure 1:
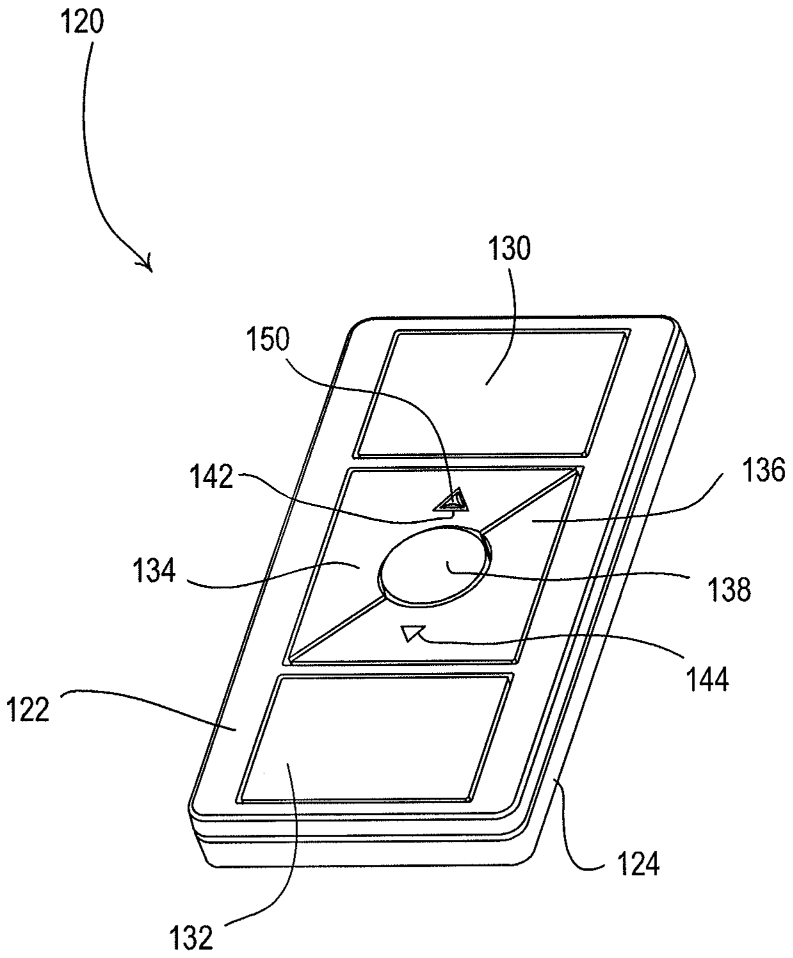
FIG. 1 is a perspective view of a remote control according to an embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
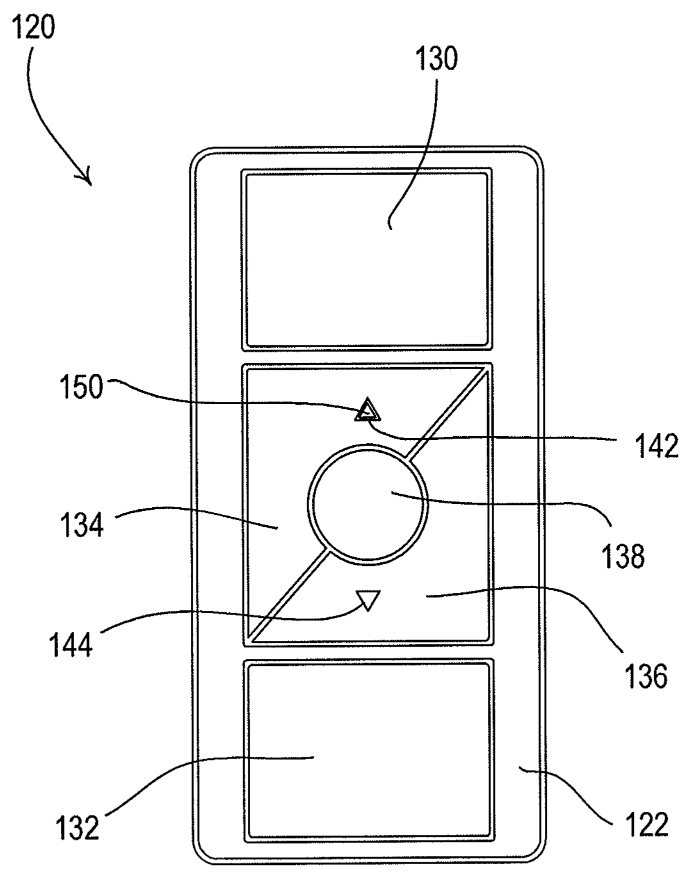
FIG. 2 is a front view of the remote control of FIG. 1.

FIG. 1 is a perspective view and FIG. 2 is a front view of a five button remote control 120 according to the present invention. The remote control 120 comprises a housing that includes a front enclosure portion 122 and a rear enclosure portion 124. The remote control 120 further comprises a plurality of control elements (i.e., an on button 130, an off button 132, a raise button 134, a lower button 136, and a preset button 138) that are provided in openings of the front enclosure portion 122. The structure of the remote control 120 is described in greater detail in U.S. patent application Ser. No. 12/399,126, filed Mar. 6, 2009, entitled WIRELESS BATTERY-POWERED REMOTE CONTROL HAVING MULTIPLE MOUNTING MEANS, the entire disclosure of which is hereby incorporated by reference.

The raise button 134 and the lower button 136 form a pair of complementary buttons, and comprise respective icons 142, 144 (i.e., indicia) for indicating the complementary functions of the raise and lower buttons (e.g., to respectively raise and lower the intensity of a controlled lighting load). The icons 142, 144 are similarly shaped, e.g., shaped (or arrows) as triangles as shown in FIGS. 1 and 2. The icons 142, 144 each comprise lines forming the periphery of the icon and an amount of empty space in the center of the icon. The raise button 134 comprises a locator bump 150 as shown in detail in FIGS. 3 and 4, which is located inside (i.e., within the periphery of) the raise icon 142 and extends outwards from the surface of the raise button by a distance $d_p$ (e.g., approximately 0.017 inch). Locator bump may be formed by the cementing of a suitably shaped plastic mass or the like to the button 134. The locator bump 150 provides tactile feedback to help a user's finger locate the raise button 134 to thus actuate the raise button (which will result in an increase the intensity of the controlled lighting load) when the remote control 120 is in a dark room.

FIGS. 3-7 show various views of the raise button 134 illustrating the locator bump 150 in greater detail.

Figure 9:
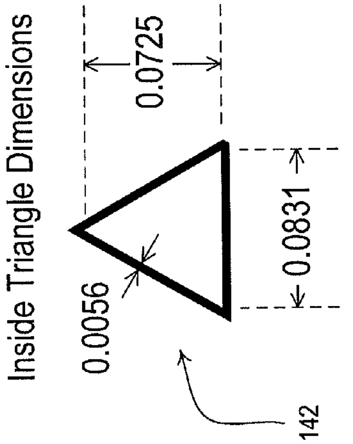
FIG. 9 is a top view like FIG. 8, but shows the inner dimensions of the triangular indicia.
Figure 10:
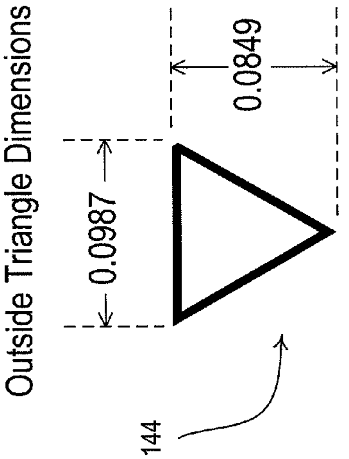
FIG. 10 is a top view of the complementary and non-bump-bearing indicia of the bump bearing indicia of FIGS. 8 and 9 and shows the outer dimensions of the triangular indicia.
Figure 11:
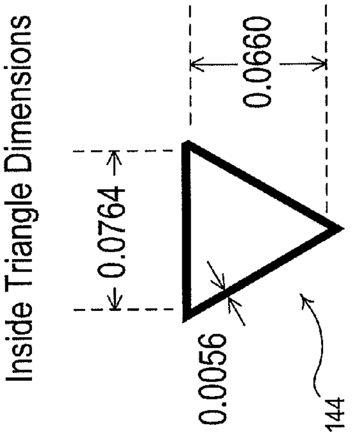
FIG. 11 is a top view like FIG. 9 but shows the inner dimensions of the triangular indicia.

It was discovered that the inclusion of the locator bump 150 inside the raise icon 142 created an optical illusion that caused the raise icon 142 (shown in FIGS. 6, 8 and 9) to appear smaller than an identically sized lower icon 144 (shown in FIGS. 10 and 11). Accordingly, the raise icon 142 is sized to be bigger than the lower icon 144 (e.g., by approximately 5%), as shown in FIGS. 8-11, so that the icons 142 and 144 will look to be the same size and of the same value to the user.

Figure 8:
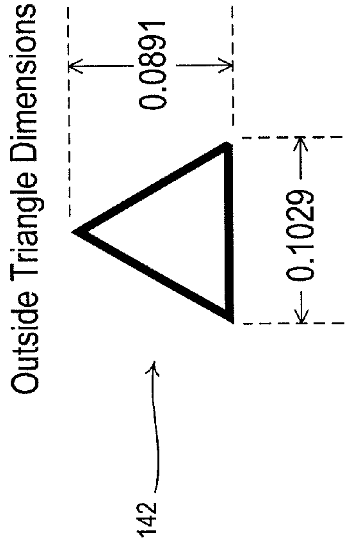
FIG. 8 is a top view of the icon (without the included bump) of FIGS. 3 and 7 and shows the outer dimensions of the icon.

FIGS. 8 and 9 show two top views of the raise icon 142 calling out the inside and outside dimensions respectively of the lines forming the periphery of the raise icon 142 to define line weight. FIGS. 10 and 11 show two front views respectively of the lower icon 144 calling out the inside and outside dimensions of the lines forming the periphery of the lower icon.

Figure 6:
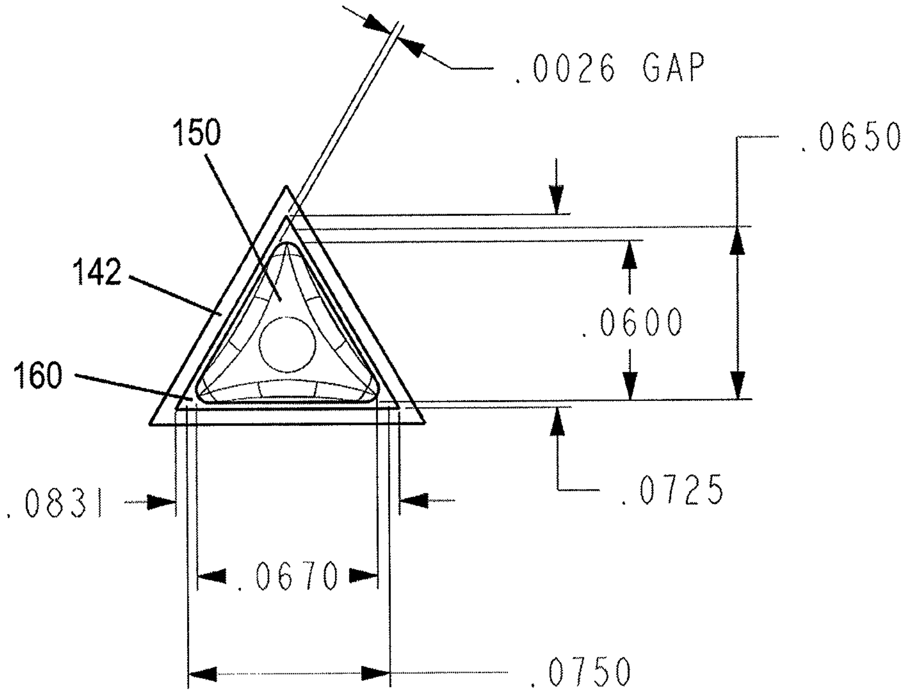
FIG. 6 is an expanded top view of the bump of FIG. 5 with representative dimensions of an embodiment.
Figure 7:
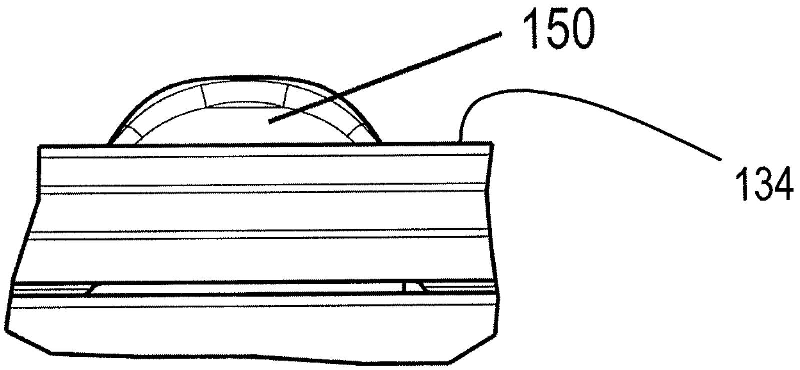
FIG. 7 is an elevation view of the bump of FIG. 6 as seen from the bottom of FIG. 6.

The icons 142 and 144 are formed as by printing or etching or the like on the planar surfaces of buttons 134 and 136 respectively and are coplanar with those surfaces which may be flat. As previously stated, to make the raise icon 142 appear to be the same size as the lower icon 144 to the human eye, the lines forming the periphery of the raise icon 142 (i.e., the sides of the triangle) are longer than the lines forming the periphery of the lower icon. In addition, the lines forming the periphery of the raise icon 142 have a smaller line weight than the lines forming the periphery of the lower icon. As shown in FIG. 6, there is also a gap 160 located between the inside of the lines forming the periphery of the raise icon 142 and the outer periphery of the locator bump 150, which further operates to cause the raise icon 142 to appear to be the same size as the lower icon 144. The outer periphery of the locator bump 150 may be sized to be approximately equal to the inside dimensions of the lower icon 144.

Figure 12:
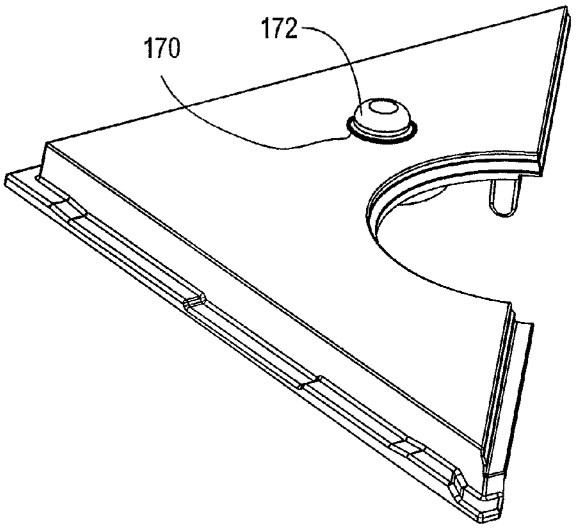
FIG. 12 is an enlarged perspective view like FIG. 3 in which the bump shape and icon are circular rather than triangular.
Figure 13:
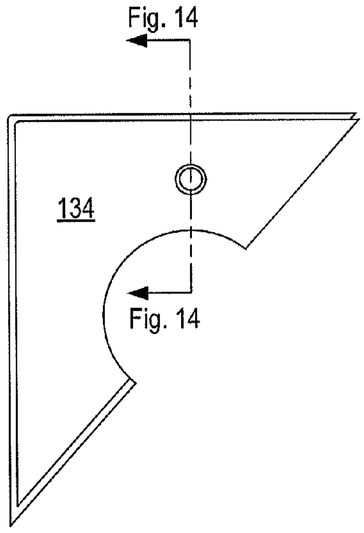
FIG. 13 is a top view of the bump of FIG. 12.
Figure 14:
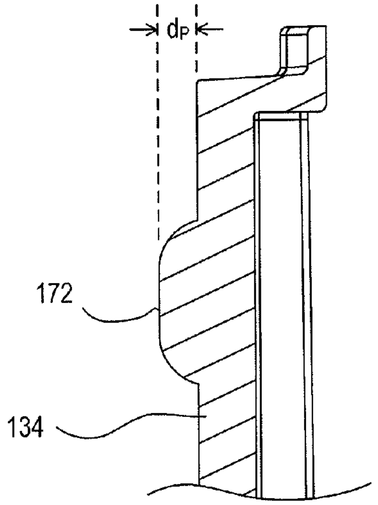
FIG. 14 is a cross-sectional view of FIG. 13 taken through the section line shown in FIG. 13.

While the present application has been described with reference to the triangular icons 142, 144, the concepts of the present invention can be applied to other similarly-shaped complementary formed icons (e.g., circularly-shaped icons) as shown in FIGS. 12, 13 and 14.

Figure 3:
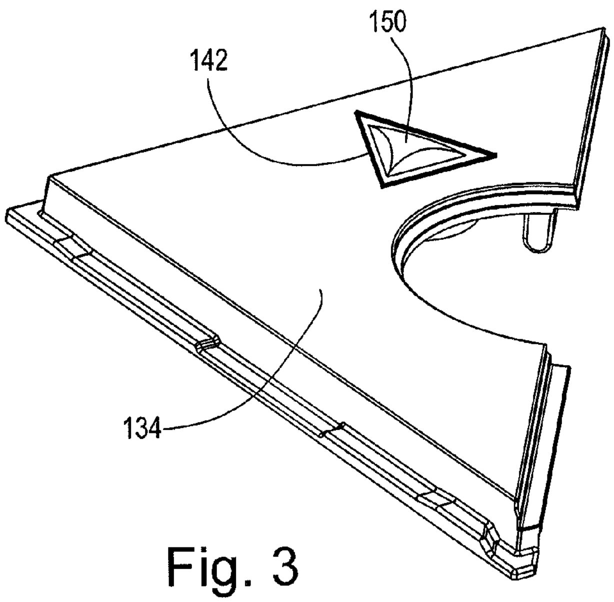
FIG. 3 is an enlarged perspective view of a raise button of the remote control of FIG. 1.
Figure 4:
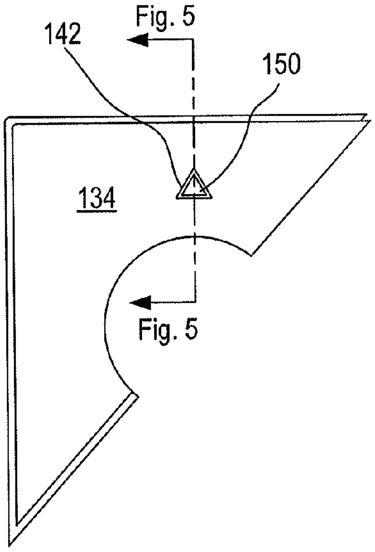
FIG. 4 is a top view of FIG. 3 and of the triangular locator bump.
Figure 5:
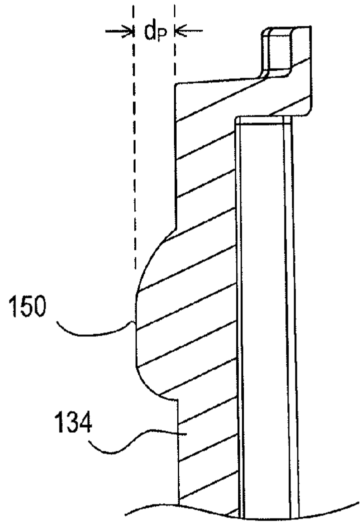
FIG. 5 is a right side cross-sectional view of the raise button of FIG. 3 taken through section line shown in FIG. 4.

FIG. 12 shows the raise button 134 of FIG. 3 in which a circular raise icon 170 is formed on the surface of raise button 134 and its interior receives a circular locator bump 172. A similar circular icon is formed on a corresponding lower button (e.g., the lower button 136 of FIGS. 1 and 2), which is paired with circular raise icon 170. The circular raise icon 170 may have an outer diameter of about 0.0750 inch and a line width of about 0.001 inch. The circular locator bump 172 is fixed to the raise button 134 at the interior of icon 170 and has a height $d_p$ of about 0.017 inch above the surface of button.

As was the case of the triangular shaped icons, circularly shaped icons on buttons (e.g., buttons 134 and 136), one of which contain a tactile bump (e.g., locator bump 142, 172) appear to have different sizes to the human eye. Therefore, the circularly-shaped icon 170 having the circular locator bump 172 inside it also has a larger diameter than a second circularly-shaped icon without a locator bump (e.g., approximately 5% bigger) on a complementary button. In addition, the line forming the circumference of the first circularly-shaped icon 170 should have a smaller line weight than the line forming the circumference of the second circularly-shaped icon.

The bump structure has been described as applied to a five button remote control (e.g., the five button remote control 120 shown in FIGS. 1 and 2). The bump structure can also be used with other controls having complementary pairs of control buttons which will benefit the user in darkened environments.

Figure 15:
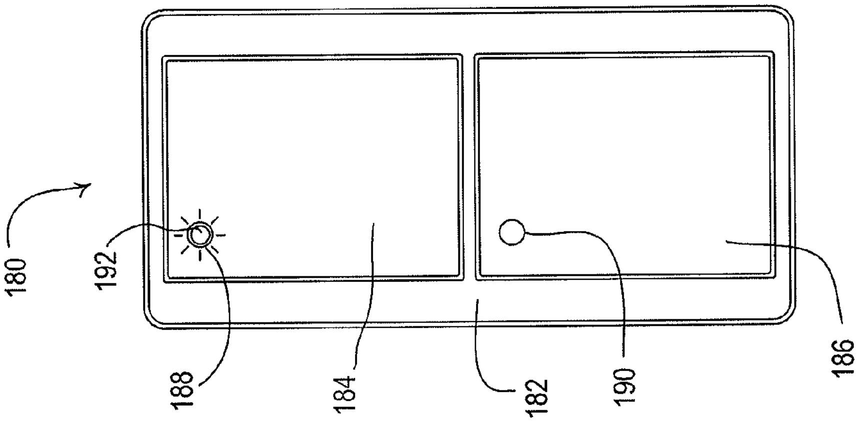
FIG. 15 is a front view of a two button on/off remote control in which the indicator for the on button is constructed in accordance with the invention.

FIG. 15 shows a front view of a two button ON/OFF lighting load (e.g., a switched load) controller 180 having a front enclosure 182, an ON button 184 and an OFF button 186. The controller 180 may be a battery operated portable device or may be a wall mounted or table top mounted device. The complementary pair of buttons 184 and 186 have indicator icons 188 and 190 respectively, shown as circular icons in FIG. 15. Icons 188 and 190 may be circular icons printed or otherwise formed on the planar surfaces of buttons 184 and 186. Icon 188 however, contains bump 192, having the structure shown in FIGS. 12-14 for bump 172. Thus, a user entering a dark environment or room can easily feel and locate the ON button to turn on a light or energize, for example, a switched load. Note that the function of icon 188 is also visually presented to the user by radial lines extending from the icon 188.

Figure 16:
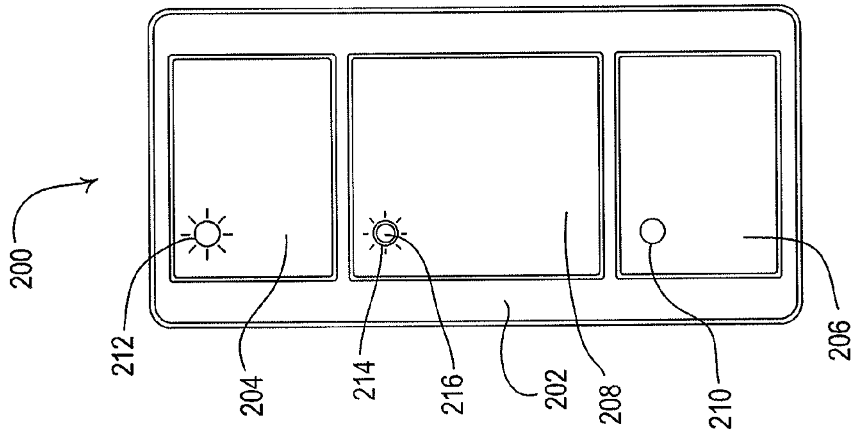
FIG. 16 is a front view of a three button-on, off and preset-remote control in which the preset button is constructed in accordance with the invention.

FIG. 16 shows a further embodiment in which a tactile bump is applied to a three button controller 200. The three button controller 200 comprises a housing that includes a front enclosure 202 and coplanar on button 204, off button 206 and preset button 208. The off button 206 has a simple circular, planar icon 210. The on button 204 carries a planar circular icon 212 (with long radial lines for a visual indicator). The preset button 208 has a planar circular icon 214 (with shorter radial lines) and a tactile locator bump 216 like that of bump 192 to enable the tactile location of button 208 in a dark room (or for a visually impaired user). Thus, the preset button 208 is easily distinguished from the complementary buttons 204 or 206.

Figure 17:
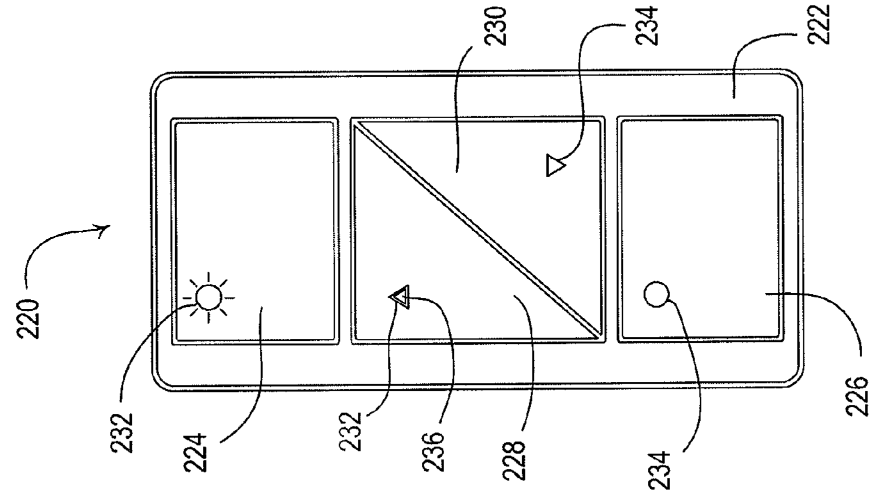
FIG. 17 is a front view of a four button remote control in which the raise button is constructed in accordance with the invention.

FIG. 17 is another embodiment of the invention for a four button controller 220. The four button controller 220 has a front enclosure 222 which contains four coplanar buttons, e.g., an on button 224, an off button 226, a raise button 228 and a lower button 230. The on and off buttons 224 and 226 have coplanar circular icons 232 and 234, respectively, while triangular buttons 228 and 230 have complementary triangular icons 232 and 234. Like the structure of FIGS. 1-8, the raise icon 232 contains a locator bump 236, so that the raise button 228 can be tactilely distinguished from the complementary button 230.

As previously described, the bumps 192, 216 and 236 or FIGS. 15, 16 and 17 respectively create an optical illusion of making the size of their icons appear smaller than that of an identical complementary planar icon (icon 190 of FIG. 15; icon 210 or icon 212 of FIG. 16 or icon 234 of FIG. 17). Thus, the size of icons 192, 212 and 236 is preferably increased to about 5% greater than its complementary planar icon.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A remote control comprising:

a first planar actuator having a first planar icon and a locator bump located within a periphery of the icon; and a second planar actuator having a second planar icon that is similarly shaped to the first icon;

wherein the first icon is about 5% bigger than the second icon, such that the icons appear to be the same size to the human eye.

2. The remote control of claim 1, wherein the first and second icons are triangularly shaped.

3. The remote control of claim 2, wherein the locator bump has an outer periphery that is triangularly shaped.

4. The remote control of claim 3, wherein there is a gap between the first icon and the outer periphery of the locator bump.

5. The remote control of claim 2, wherein lines forming the periphery of the first icon are longer than lines forming the periphery of the second icon.

6. The remote control of claim 5, wherein the lines forming the periphery of the first icon have a smaller line weight than the lines forming the periphery of the second icon.

7. The remote control of claim 1, wherein the first and second icons are circularly shaped.

8. The remote control of claim 7, wherein the locator bump has an outer periphery that is circularly shaped.

9. The remote control of claim 8, wherein there is a gap between the first icon and the outer periphery of the locator bump.

10. The remote control of claim 7, wherein the first icon has a larger diameter than the second icon.

11. The remote control of claim 10, wherein the line forming the circumference of the first icon has a smaller line weight than the line forming the circumference of the second icon.

12. The remote control of claim 1, wherein the first icon is approximately 5% bigger than the second icon.

13. The remote control of claim 1, wherein there is a gap between the first icon and the outer periphery of the locator bump.

14. The remote control of claim 1, wherein the remote control is operable to transmit a command for raising the intensity of a lighting load in response to an actuation of the first actuator.

15. An electrical control comprising:

a pair of first and second spaced complementary actuator buttons having coplanar surfaces; each of said pair of actuator buttons having similarly shaped planar respective first and second icons;

said first icon containing a locating bump located within the periphery of said first icon and extending above the surface of said first actuator button whereby said first actuator button with the locating bump can be tactilely distinguished from said second actuator button which is free of such a locating bump.

16. The electrical control of claim 15, wherein the first and second icons are triangularly shaped.

17. The electrical control of claim 16, wherein the locator bump has an outer periphery that is triangular shaped.

18. The electrical control of claim 15, wherein the first and second icons are circularly shaped.

19. The electrical control of claim 18, wherein the locator bump has an outer periphery that is circularly shaped.

20. The electrical control of claim 15, wherein the control is operable to transmit a command for raising the intensity of a lighting load in response to an actuation of the first actuator.

21. The electrical control of claim 15 wherein said first icon containing said bump is larger than said second icon such that both icons appear to be the same size to the human eye.

22. The electrical control of claim 21, wherein the first and second icons are triangularly shaped.

23. The electrical control of claim 22, wherein the locator bump has an outer periphery that is triangularly shaped.

24. The electrical control of claim 22, wherein lines forming the periphery of the first icon are longer than lines forming the periphery of the second icon.

25. The electrical control of claim 24, wherein the lines forming the periphery of the first icon have a smaller line weight than the lines forming the periphery of the second icon.

26. The electrical control of claim 21, wherein the first and second icons are circularly shaped.

27. The electrical control of claim 26, wherein the locator bump has an outer periphery that is circularly shaped.

28. The electrical control of claim 26, wherein the first icon has a larger diameter than the second icon.

29. The electrical control of claim 21, wherein the control is operable to transmit a command for raising the intensity of a lighting load in response to an actuation of the first actuator.

* * * * *